(12) United States Patent
Omi et al.

(10) Patent No.: US 7,648,315 B2
(45) Date of Patent: Jan. 19, 2010

(54) CUTTER HOLDER

(75) Inventors: Shohei Omi, Anjo (JP); Kazuyoshi Inagaki, Anjo (JP)

(73) Assignee: OMI Kogyo Co., Ltd., Aichi-Ken (JP)

( * ) Notice: Subject to any disclaimer, the term of this patent is extended or adjusted under 35 U.S.C. 154(b) by 379 days.

(21) Appl. No.: 11/821,871

(22) Filed: Jun. 26, 2007

(65) Prior Publication Data

US 2008/0260481 A1 Oct. 23, 2008

(30) Foreign Application Priority Data

Apr. 23, 2007 (JP) ............................... 2007-113054

(51) Int. Cl.
*B23B 51/04* (2006.01)
(52) U.S. Cl. ............................ 408/57; 279/71; 279/81; 408/204; 408/206; 408/240
(58) Field of Classification Search .................. 408/57, 408/59, 56, 204–209, 238, 239 R, 240; 279/71, 279/74–75, 81–82, 155, 20; *B23B 51/04*, *B23B 51/05*
See application file for complete search history.

(56) References Cited

U.S. PATENT DOCUMENTS

| | | | | |
|---|---|---|---|---|
| 4,090,804 A | * | 5/1978 | Haley | 408/59 |
| 4,624,608 A | * | 11/1986 | Shiomi et al. | 408/56 |
| 5,171,111 A | * | 12/1992 | Kishimoto | 408/67 |
| 5,427,482 A | * | 6/1995 | Asano et al. | 408/240 |
| 5,429,457 A | * | 7/1995 | Asano et al. | 408/204 |
| 5,447,397 A | * | 9/1995 | Asano | 408/59 |
| 6,250,856 B1 | * | 6/2001 | Miyanaga | 408/57 |
| 6,588,993 B2 | * | 7/2003 | Omi | 408/226 |
| 6,966,730 B1 | * | 11/2005 | Miyanaga | 408/204 |

FOREIGN PATENT DOCUMENTS

| | | |
|---|---|---|
| JP | 07-009226 | 1/1995 |
| JP | 2004330376 A | * 11/2004 |

* cited by examiner

*Primary Examiner*—Daniel W Howell
(74) *Attorney, Agent, or Firm*—Patterson, Thuente, Skaar & Christensen, P.A.

(57) ABSTRACT

A lock body in a locked state is inserted radially inward of an outer surface. A stopper body in a contact state holds the lock body in an unlocked state. The stopper body in a non-contact state is retracted from the lock body. A pressing body is switchable between a standby state and a retracted state. The pressing body in the standby state selectively contacts a central shaft when an insertion portion is inserted in a support cylinder. The pressing body in the retracted state is retracted from the stopper body. An urging member urges the pressing body into the standby state, and urges the stopper body into the contact state. The urging member detachably engages the pressing body to the stopper body. Thus, the structure of the cutter holder is simple.

7 Claims, 6 Drawing Sheets

CUTTER HOLDER

BACKGROUND OF THE INVENTION

The present invention relates to a holder on which various cutters such as a hole cutter are mounted. The cutter holder supports, for example, a shank of the hole cutter.

Japanese Patent No. 2558054 discloses a cutter holder, which includes locking balls (7) for locking a cutter (6) on a support cylinder (1), a stopper body (2), and a valve body (11) of an oil valve. Numerals in parentheses are reference numerals in the above publication. A first spring (3) urges the stopper body (2) to support the locking balls (7) in an unlocked state. A second spring (13) urges the valve body (11) to prevent cutting oil from flowing out when the cutter (6) is not being used.

As described above, the cutter holder of the above publication includes the first spring (3) for supporting the locking balls (7) in the unlocked state and the second spring (13) for closing the oil valve separately. Thus, the structure of the cutter holder is complicated.

SUMMARY OF THE INVENTION

Accordingly, it is an objective of the present invention to provide a cutter holder having a simple structure.

According to one aspect of the present invention, a cutter holder to which a cutter is attached is provided. The cutter defines a rotation axis. The cutter includes an insertion portion, which is inserted in the cutter holder, and a central shaft, which is movable relative to the insertion portion in the direction of the rotation axis. The insertion portion includes an outer surface, which extends along the rotation axis. The cutter holder includes a support cylinder in which the insertion portion is detachably inserted. A locking operation body is movable relative to the support cylinder. The locking operation body is movable between a locking position for locking the insertion portion in the support cylinder and an unlocking position where the insertion portion is permitted to be unlocked with respect to the support cylinder. A lock body is located between the outer surface and the support cylinder. The lock body is switchable between a locked state and an unlocked state. The locking operation body in the locking position brings the lock body into the locked state. The locking operation body in the unlocking position brings the lock body into the unlocked state. The lock body in the locked state is located radially inward of the outer surface. The lock body in the unlocked state is permitted to retract radially outward of the outer surface. A stopper body is movable relative to the support cylinder. The stopper body is switchable between a contact state and a non-contact state. The stopper body in the contact state holds the lock body in the unlocked state. The stopper body in the non-contact state is retracted from the lock body. A pressing body is switchable between a standby state and a retracted state. The pressing body in the standby state selectively contacts the central shaft when the insertion portion is inserted in the support cylinder. The pressing body in the retracted state is retracted from the stopper body. An urging member urges the pressing body such that the pressing body is brought into the standby state and urges the stopper body such that the stopper body is brought into the contact state. The urging member detachably engages the pressing body to the stopper body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENT

FIGS. 1A to 6B illustrate one embodiment of the present invention.

Figure 1A:
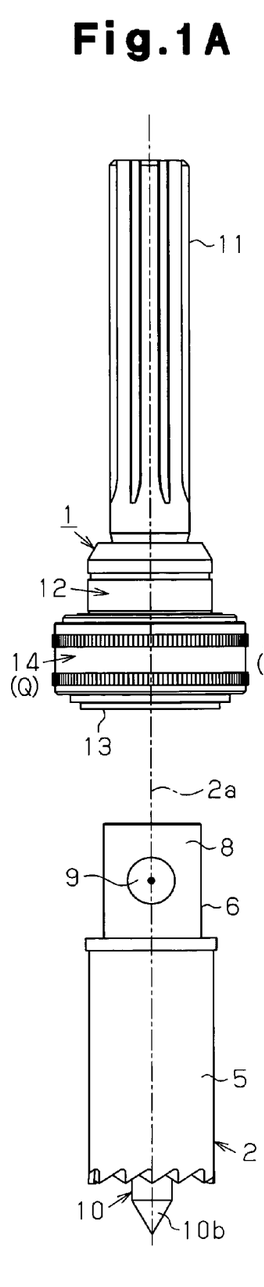
FIG. 1A is a front view illustrating a cutter holder and a cutter according to one embodiment of the present invention.

FIG. 1A illustrates a cutter holder 1 according to one embodiment. A cutter 2 is mounted on the cutter holder 1. For convenience of illustration, the cutter holder 1 is located at the upper position and the cutter 2 is located at the lower position in FIG. 1A. However, the orientation is not limited to this, but the cutter holder 1 may be located upside down or laid horizontally.

Figures 1B, 1C, 1D:
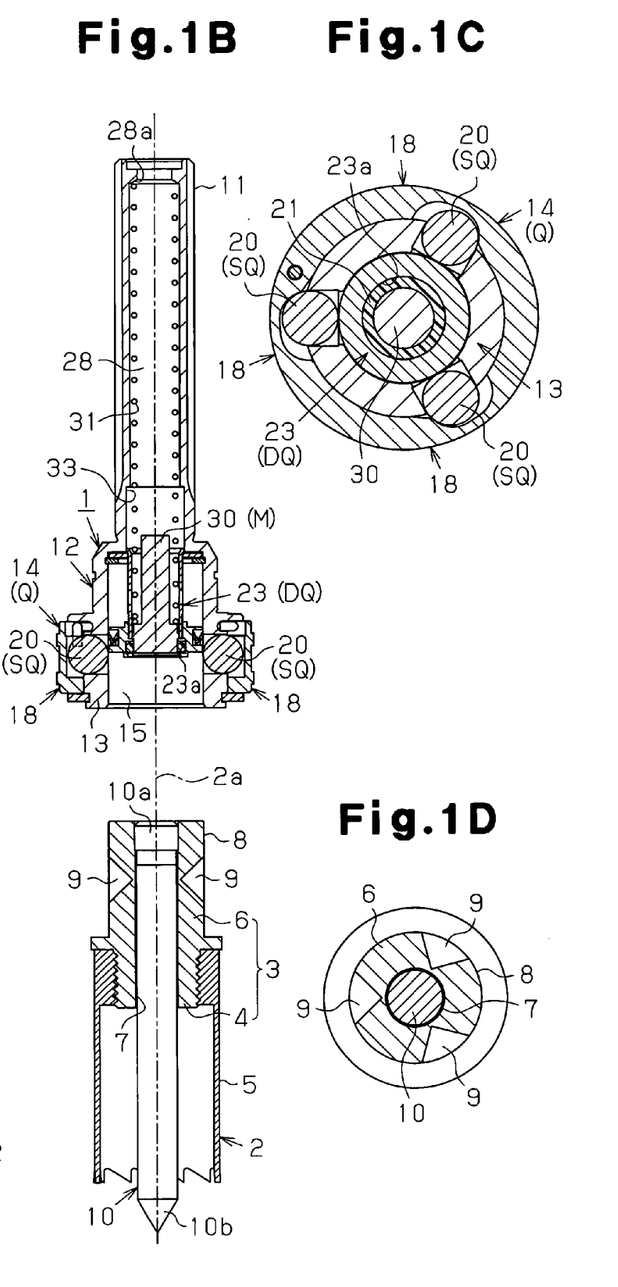
FIG. 1B is a longitudinal cross-sectional view of FIG. 1A.
FIG. 1C is a transverse cross-sectional view illustrating the cutter holder of FIG. 1B.
FIG. 1D is a transverse cross-sectional view illustrating the cutter of FIG. 1B.

First, the cutter 2 will be described. As shown in FIG. 1B, the cutter 2 includes a columnar shank 3, a blade cylinder 5, which is screwed to the shank 3, and a central shaft 10. The central shaft 10 extends through the shank 3 and the blade cylinder 5, and is movable relative to the shank 3 and the blade cylinder 5. The shank 3 has a flange at its substantially middle portion. Part of the shank 3 lower than the flange is a coupling portion 4 having a thread formed on its outer circumferential surface. Part of the shank 3 upper than the flange is an insertion portion 6, which will be inserted in the cutter holder 1. A fitting portion, which is an insertion portion in this embodiment, may include not only the shank 3, but also a sleeve (not shown) and a socket (not shown) in which the shank 3 is inserted. The blade cylinder 5 for drilling a hole is screwed to the coupling portion 4. The insertion portion 6 extends upward of the blade cylinder 5. A central bore 7 of the shank 3 extends through the insertion portion 6 and the coupling portion 4. The central shaft 10 is inserted in the central bore 7. A rotation axis 2a of the blade cylinder 5 extends through the central bore 7.

The outer surface, that is, the outer circumferential surface of the insertion portion 6 is a slide surface 8. When the insertion portion 6 is inserted in the cutter holder 1 and when the insertion portion 6 is detached from the cutter holder 1, the slide surface 8 slides with respect to the cutter holder 1. An insertion and removal path-plane, which is the slide surface 8 in this embodiment, is a cylindrical surface having its center at the rotation axis 2a. The slide surface 8 has locking recesses 9. In this embodiment, the number of the locking recesses 9 is three and the locking recesses 9 are arranged at equal intervals about the rotation axis 2a. The locking recesses 9 are conical and point radially inward.

The proximal end (upper end) of the central shaft 10 is a pressing head 10a, and the distal end (lower end) 10b of the central shaft 10 is pointed. The center portion, which is the distal end 10b in this embodiment, is used for determining the position of the cutter 2 with respect to a workpiece W (shown in FIG. 6B). As shown in FIG. 1B, when the distal end 10b projects downward from the blade cylinder 5, the pressing head 10a is located in the central bore 7.

The cutter holder 1 will now be described. As shown in FIGS. 1A to 2B, the cutter holder 1 includes a cylindrical spline shank 11, a support cylinder 12, which is formed integrally with the spline shank 11, and a locking operation cylinder 14, which surrounds the support cylinder 12. Furthermore, the cutter holder 1 includes locking balls 20, a stopper body 23 for supporting the locking balls 20, a valve body 30, and a dual purpose spring 31. The dual purpose spring 31 urges the stopper body 23 and the valve body 30 downward in the drawings.

Spline is formed on the outer circumferential surface of the spline shank 11, which extends upward of the support cylinder 12. The spline shank 11 is detachably mounted on a machine tool (not shown), which drives the cutter 2. The lower half of the support cylinder 12 is an open cylinder 13. A support hole 15 of the support cylinder 12 is open downward of the open cylinder 13.

Next, a lock mechanism 18 for locking the cutter 2 in the cutter holder 1 will be described.

Figure 2B:
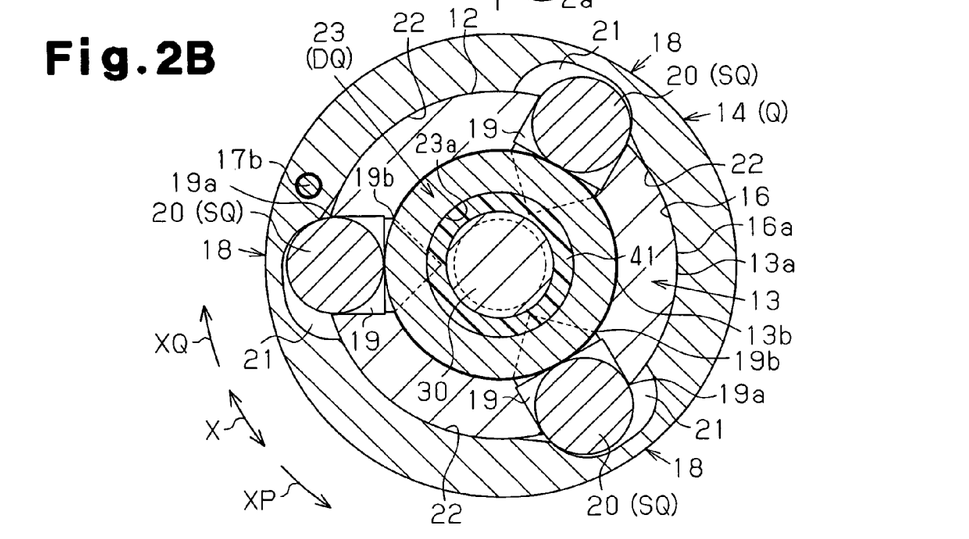
FIG. 2B is a transverse cross-sectional view of FIG. 1A.
Figure 3A:
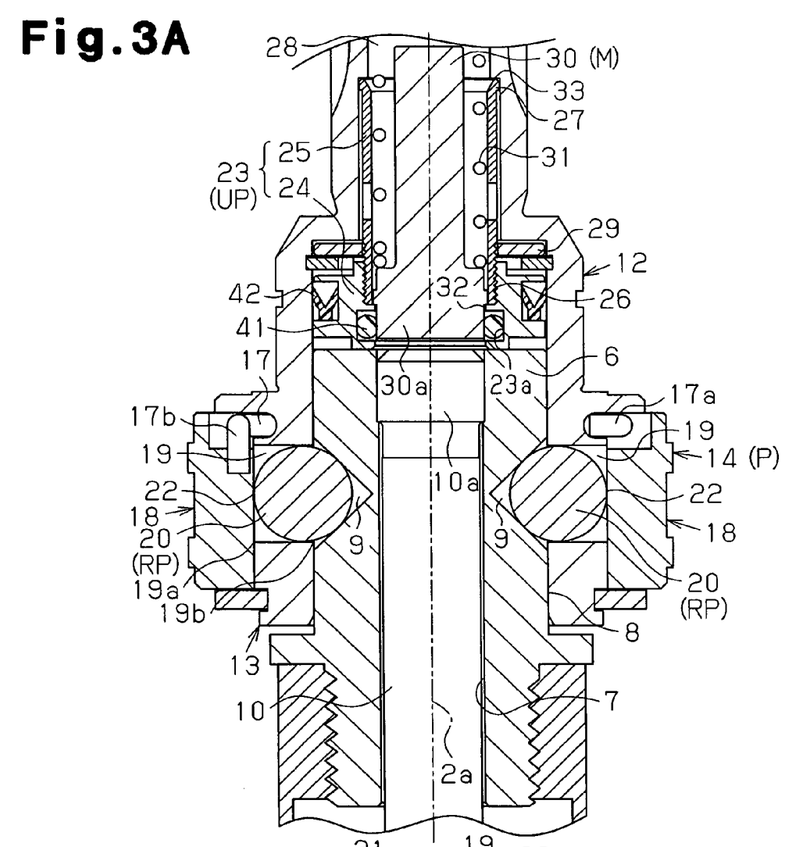
FIG. 3A is a longitudinal cross-sectional view illustrating a state where the cutter is locked in the cutter holder of FIG. 2A.
Figure 3B:
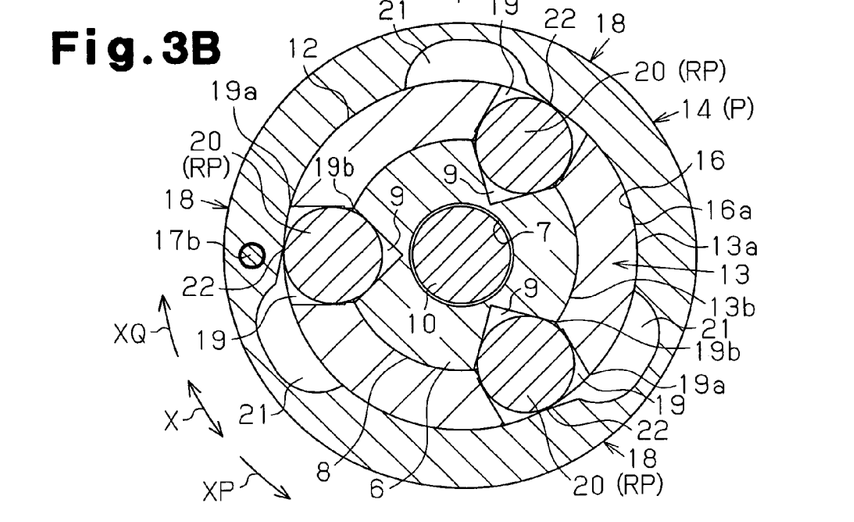
FIG. 3B is a transverse cross-sectional view of FIG. 3A.

The locking operation cylinder 14 and the locking balls 20 configure the lock mechanism 18. As shown in FIGS. 2B and 3B, the support cylinder 12 has accommodating holes 19. In this embodiment, three accommodating holes 19 are arranged at equal intervals about the rotation axis 2a. Each accommodating hole 19 accommodates a movable locking ball, which is the locking ball 20 in this embodiment. Each accommodating hole 19 extends through the circumferential wall of the support cylinder 12 in the radial direction. That is, each accommodating hole 19 includes an outer opening 19a, which opens radially outward, and an inner opening 19b, which opens radially inward. The outer openings 19a face the locking operation cylinder 14. As shown in FIG. 3A, when the insertion portion 6 of the cutter 2 is inserted in the support cylinder 12, the inner openings 19b are at the same height as the locking recesses 9.

A locking operation body, which is the locking operation cylinder 14 in this embodiment, is rotatably supported by the support cylinder 12. The locking operation cylinder 14 surrounds the open cylinder 13 from the outside. That is, an inner circumferential surface 16a of a guide bore 16 of the locking operation cylinder 14 faces an outer circumferential surface 13a of the open cylinder 13. The locking balls 20 are located between the support cylinder 12 and the locking operation cylinder 14.

The locking operation cylinder 14 is rotatable about the rotation axis 2a relative to the support cylinder 12. The rotational direction of the locking operation cylinder 14 is referred to as a rotational direction X. FIG. 2B is a transverse cross-sectional view of the cutter holder 1 and the cutter 2 as viewed from the upper side in FIG. 2A. In FIG. 2B, the counterclockwise direction of the rotational direction X is referred to as a locking direction XP, and the clockwise direction of the rotational direction X is referred to as an unlocking direction XQ. The locking operation cylinder 14 is rotatable between a locking position P and an unlocking position Q.

As shown in FIGS. 3A, 3B, 4A, and 4B, the locking operation cylinder 14 located at the locking position P locks the cutter 2 and the locking balls 20 to the support cylinder 12. That is, each locking ball 20 is engaged with one of the locking recesses 9 and held in a locked state RP.

Also, as shown in FIGS. 1B, 1C, 2A, 2B, 5A, and 5B, the locking operation cylinder 14 located at the unlocking position Q unlocks the cutter 2 and the locking balls 20 from the support cylinder 12. That is, each locking ball 20 is in an unlocked state SQ where the locking ball 20 is permitted to separate from the associated locking recess 9. In this state, the cutter 2 is permitted to be detached from the support cylinder 12.

Figure 2A:
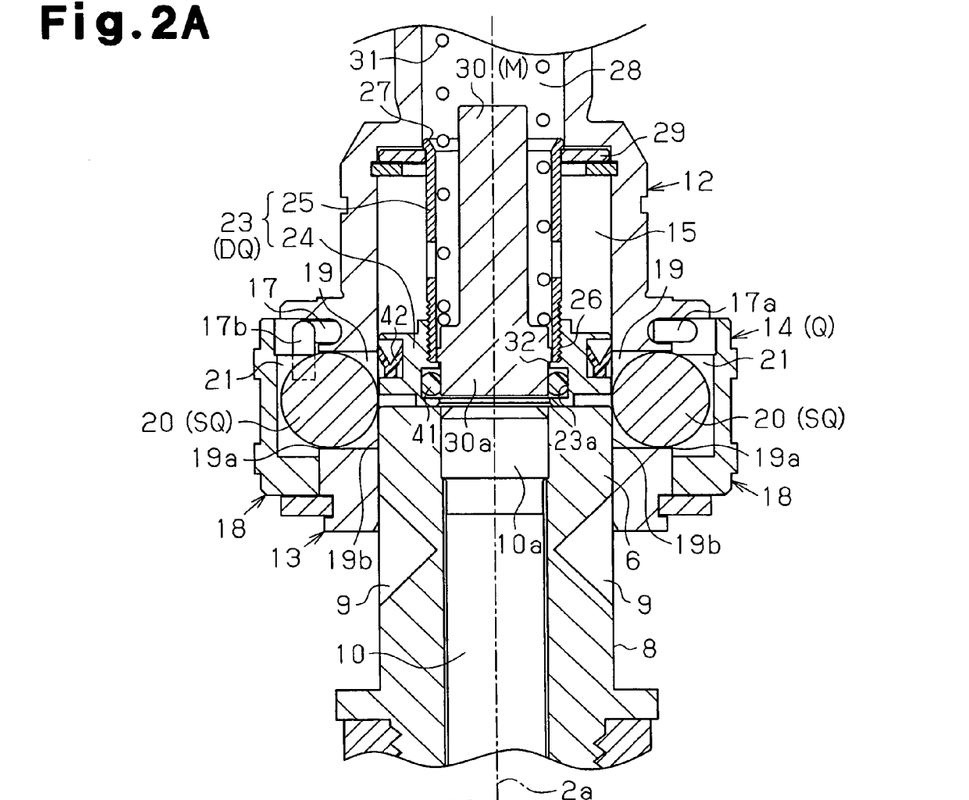
FIG. 2A is a partially enlarged cross-sectional view illustrating a state where the cutter is inserted in the cutter holder of FIG. 1B but is not locked yet.

As shown in FIG. 2A, a lock spring 17 is located between the support cylinder 12 and the locking operation cylinder 14. The lock spring 17 is a torsion coil spring. A first end 17a of the lock spring 17 is engaged with the support cylinder 12 and a second end 17b of the lock spring 17 is engaged with the locking operation cylinder 14. The lock spring 17 urges the locking operation cylinder 14 in the locking direction XP relative to the open cylinder 13. That is, the lock spring 17 urges the locking operation cylinder 14 such that the locking operation cylinder 14 moves from the unlocking position Q to the locking position P.

The locking operation cylinder 14 moves in the unlocking direction XQ when manipulated against the force of the lock spring 17.

Retraction recesses 21 and retraction stoppers 22 are formed in the inner circumferential surface 16a of the locking operation cylinder 14. In this embodiment, three retraction recesses 21 and three retraction stoppers 22 are arranged at equal intervals about the rotation axis 2a. As shown in FIGS. 2A and 2B, when the locking operation cylinder 14 is located at the unlocking position Q, the retraction recesses 21 face the accommodating holes 19. That is, the locking balls 20 are held in the unlocked state SQ where the locking balls 20 move radially outward beyond the slide surface 8 and are located in the accommodating holes 19 and the retraction recesses 21.

Furthermore, as shown in FIGS. 3A and 3B, when the locking operation cylinder 14 is located at the locking position P, the retraction stoppers 22 face the accommodating holes 19. Thus, the retraction stoppers 22 bring the locking balls 20 into the locked state RP. That is, the retraction stoppers 22 restrict the locking balls 20 from moving radially outward from the accommodating holes 19 beyond the slide surface 8.

The dual purpose spring 31 will now be described.

As shown in FIG. 1B, the cylindrical spline shank 11 includes a spring accommodating hole 28, which extends in the direction of the rotation axis 2a. The diameter of the support hole 15 of the support cylinder 12 is greater than that of the spring accommodating hole 28. The spring accommodating hole 28 accommodates an urging member, which is the dual purpose spring 31 in this embodiment. A compression coil spring, which is the dual purpose spring 31 in this embodiment, exerts elastic force (urging force), which urges the valve body 30 toward the open cylinder 13 from the spline shank 11. The upper end of the dual purpose spring 31 abuts against a ceiling 28a of the spring accommodating hole 28, and the lower end of the dual purpose spring 31 abuts against the valve body 30.

The valve body 30 is movable in the direction of the rotation axis 2a in the spring accommodating hole 28 and the support hole 15 of the support cylinder 12. A pressing body, which is the valve body 30 in this embodiment, is a columnar body extending in the direction of the rotation axis 2a. The valve body 30 has an abutment portion 30a, which faces the open cylinder 13.

The spring accommodating hole 28 and the support hole 15 accommodate the stopper body 23. The stopper body 23 is switched between a contact state DQ, in which the locking balls 20 in the unlocked state SQ are prevented from falling inside the support cylinder 12, and a non-contact state UP, in which the stopper body 23 is retracted from the locking balls 20. The stopper body 23 is movable relative to the support cylinder 12 in the direction of the rotation axis 2a. The valve body 30 is movable relative to the stopper body 23 in the direction of the rotation axis 2a.

A valve hole 23a is formed in the stopper body 23. The valve body 30 selectively opens and closes the valve hole 23a. The valve body 30 and the valve hole 23a configure an oil valve for a cutting oil. When the cutter holder 1 is mounted on the machine tool (not shown), the machine tool supplies the cutting oil into the spring accommodating hole 28. An oil hole is formed in the ceiling 28a of the spring accommodating hole 28. The valve body 30 closes the valve hole 23a when the blade cylinder 5 is not cutting the workpiece W. As a result, the cutting oil is prevented from leaking from the spring accommodating hole 28 to the cutter 2. The dual purpose spring 31 urges the valve body 30 so that the valve body 30 closes the valve hole 23a.

When the valve body 30 closes the valve hole 23a, which is a closed valve state M, the valve body 30 is in a standby state. When the valve body 30 opens the valve hole 23a, which is an open valve state N, the valve body 30 is in a retracted state. An O-ring 41 is located in the valve hole 23a. The O-ring 41 contacts the valve body 30 in the closed valve state M. The abutment portion 30a of the valve body 30 in the closed valve state M faces the central shaft 10 via the valve hole 23a.

Figure 4A:
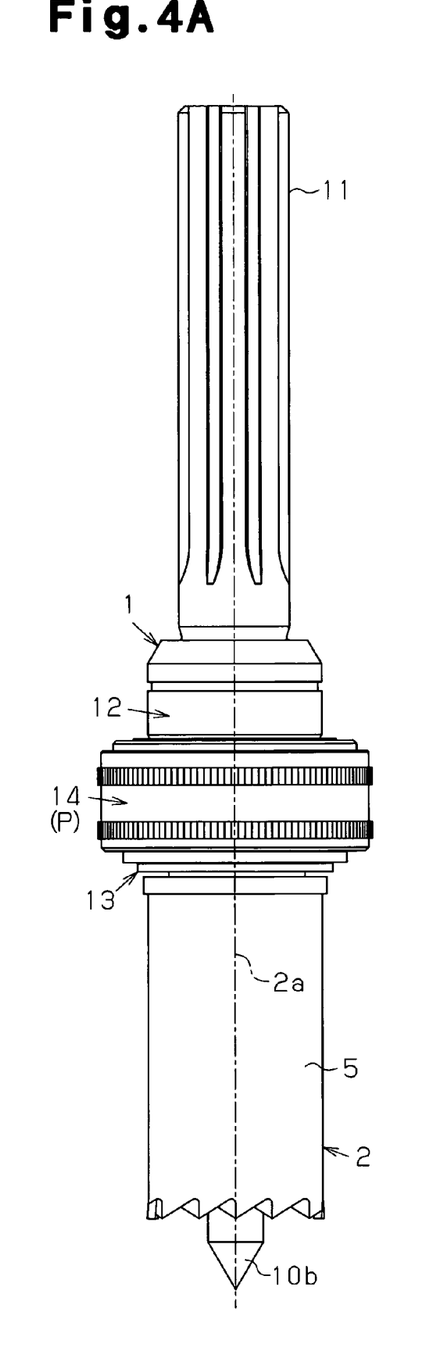
FIG. 4A is a front view illustrating the cutter and the cutter holder of FIG. 3A as a whole.
Figure 4B:
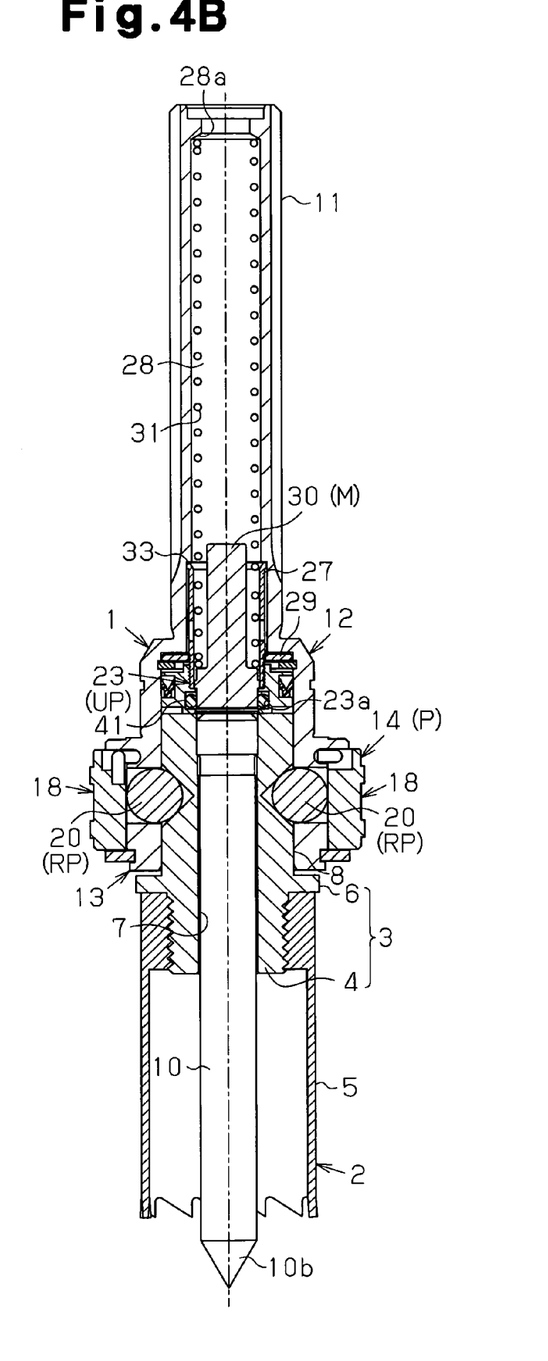
FIG. 4B is a longitudinal cross-sectional view of FIG. 4A.
Figure 5A:
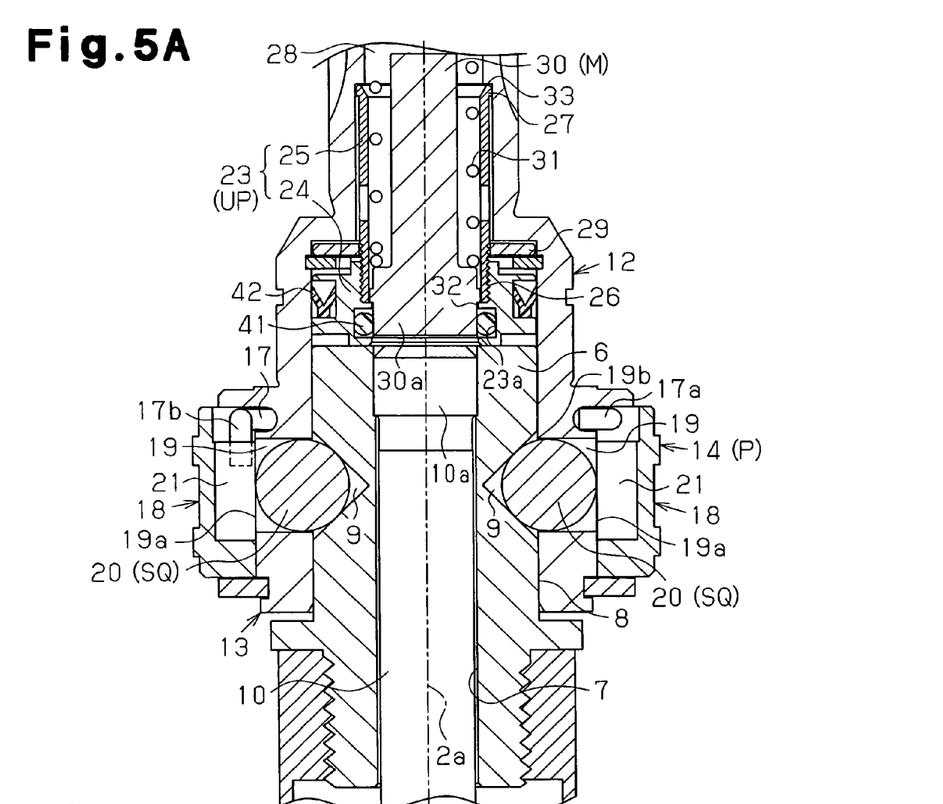
FIG. 5A is a longitudinal cross-sectional view illustrating a state where the cutter is not locked in the cutter holder of FIG. 3A.
Figure 5B:
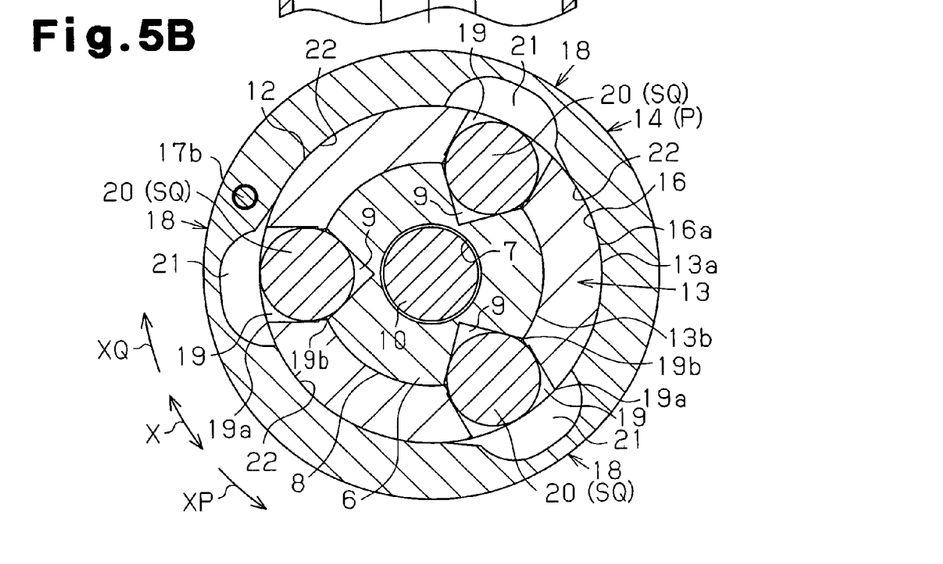
FIG. 5B is a transverse cross-sectional view of FIG. 5A.

A stopper ring 24 is movable between the contact state DQ, in which the locking balls 20 in the unlocked state SQ are held as shown in FIGS. 1B and 2A, and the non-contact state UP, in which the stopper ring 24 is separate from the locking balls 20 as shown in FIGS. 3A, 4B, and 5A.

As shown in FIG. 2A, the stopper body 23 includes the stopper ring 24 for engaging with the locking balls 20 and an engaging cylinder 25, which extends from the stopper ring 24. The engaging cylinder 25 is screwed to the stopper ring 24 with a threaded portion 26.

The diameter of the stopper ring 24 is greater than that of the engaging cylinder 25. The stopper ring 24 prevents the locking balls 20 in the unlocked state SQ from falling inside the support cylinder 12. The stopper ring 24 has the valve hole 23a. The stopper ring 24 has an interlocking portion 32, which projects radially inward in the valve hole 23a. The valve body 30 abuts against the interlocking portion 32 so as to close the valve hole 23a, which is the closed valve state M. More specifically, the valve body 30 has a flange, which contacts the interlocking portion 32. The outer circumferential surface of the stopper ring 24 accommodates a sealing member 42. The sealing member 42 seals between the inner circumferential surface of the support cylinder 12 and the stopper ring 24.

The engaging cylinder 25 extends from the stopper ring 24 toward the ceiling 28a of the spring accommodating hole 28. An engaging portion, which is an engaging rim 27 in this embodiment, is formed at the upper end of the engaging cylinder 25 by bending radially outward.

An engaging ring 29 is arranged at the boundary between the spring accommodating hole 28 and the support hole 15. The inner diameter of the engaging ring 29 is smaller than that of the spring accommodating hole 28. The engaging cylinder 25 extends in the direction of the rotation axis 2a and extends through the engaging ring 29. As shown in FIG. 2A, when the engaging rim 27 engages with the inner circumferential edge of the engaging ring 29, the stopper body 23 is brought into the contact state DQ.

As shown in FIG. 3A, a step 33 is formed on the inner circumferential surface of the spring accommodating hole 28 between the engaging ring 29 and the ceiling 28a of the spring accommodating hole 28. When the engaging rim 27 engages with the step 33, the stopper body 23 is brought into the non-contact state UP.

The operation for mounting the cutter 2 of FIG. 1B on the cutter holder 1 will now be described.

First, the state where the cutter 2 is detached from the cutter holder 1 as shown in FIGS. 1A to 1D will be described. The urging force of the dual purpose spring 31 brings the valve body 30 into the closed valve state M. The valve body 30 in the closed valve state M contacts the interlocking portion 32 with pressure. The urging force of the dual purpose spring 31 is transmitted to the stopper body 23 from the valve body 30 via the interlocking portion 32. As a result, the engaging rim 27 of the stopper body 23 engages with the stopper ring 24. That is, the stopper body 23 is in the contact state DQ. The stopper body 23 supports the locking balls 20 in the unlocked state SQ. The locking balls 20 project radially outward from the outer circumferential surface 13a of the open cylinder 13, and project in the retraction recesses 21 of the locking operation cylinder 14. The locking operation cylinder 14 is located in the unlocking position Q.

Next, the insertion portion 6 of the cutter 2 is inserted in the support cylinder 12 as shown in FIGS. 2A and 2B. The slide surface 8 of the insertion portion 6 slides along the inner circumferential surface 13b of the support hole 15. FIGS. 2A and 2B illustrate the state where the insertion portion 6 abuts against the stopper body 23. The pressing head 10a of the central shaft 10 abuts against the abutment portion 30a of the valve body 30.

When the insertion portion 6 is inserted deeply into the support cylinder 12 against the elastic force of the dual purpose spring 31, the insertion portion 6 moves the stopper body 23 from the contact state DQ to the non-contact state UP shown in FIGS. 3A and 4B. The engaging rim 27 of the engaging cylinder 25 is engaged with the step 33 of the spring accommodating hole 28. Since the valve body 30 is engaged with the stopper body 23 by the interlocking portion 32, the valve body 30 moves upward with the stopper body 23. However, as shown in FIGS. 3A and 4B, the valve body 30 is still in the closed valve state M.

The lock spring 17 urges the locking operation cylinder 14 in the locking direction XP. Thus, as shown in FIGS. 3A and 4B, when the locking recesses 9 are at the same height as the locking balls 20, the locking operation cylinder 14 moves from the unlocking position Q to the locking position P. The retraction stoppers 22 urge the locking balls 20 radially inward and cause the locking balls 20 to project radially inward of the slide surface 8 to be inserted in the locking recesses 9. That is, the locking balls 20 are brought into the locked state RP. As a result, the cutter 2 is locked in the cutter holder 1 as shown in FIGS. 3A and 4B.

The case where the cutter 2 is removed from the cutter holder 1 will now be described. First, the locking operation cylinder 14 is rotated in the unlocking direction XQ against the elastic force of the lock spring 17. That is, the locking operation cylinder 14 is moved from the locking position P to the unlocking position Q shown in FIG. 5A. Thus, the locking balls 20 are brought into the unlocked state SQ, where the locking balls 20 are inserted in the retraction recesses 21 of the locking operation cylinder 14. As shown in FIG. 5A, since the locking recesses 9 are conical, the urging force of the dual purpose spring 31 presses the locking balls 20 from the locking recesses 9 toward the retraction recesses 21. That is, the locking balls 20 separate from the locking recesses 9. Thus, the urging force of the dual purpose spring 31 presses out the insertion portion 6 of the support cylinder 12 as shown in FIG. 1B. The urging force of the dual purpose spring 31 causes the stopper body 23 to return to the contact state DQ and support the locking balls 20 as shown in FIG. 1B.

The operation for cutting the workpiece W with the blade cylinder 5 will now be described.

Figure 6A:
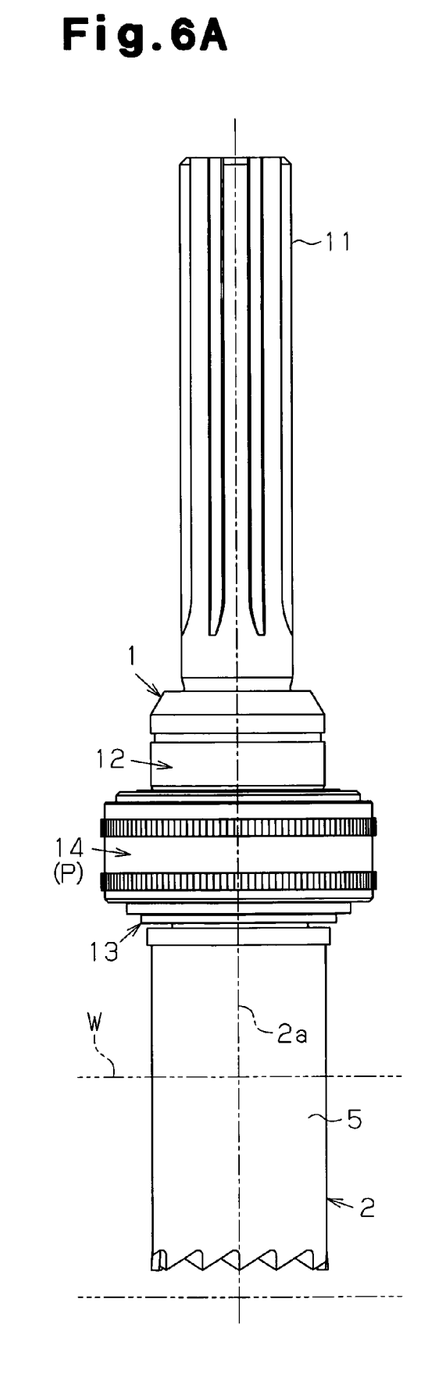
FIG. 6A is a front view illustrating a state where the cutter of FIG. 4A is cutting a workpiece.
Figure 6B:
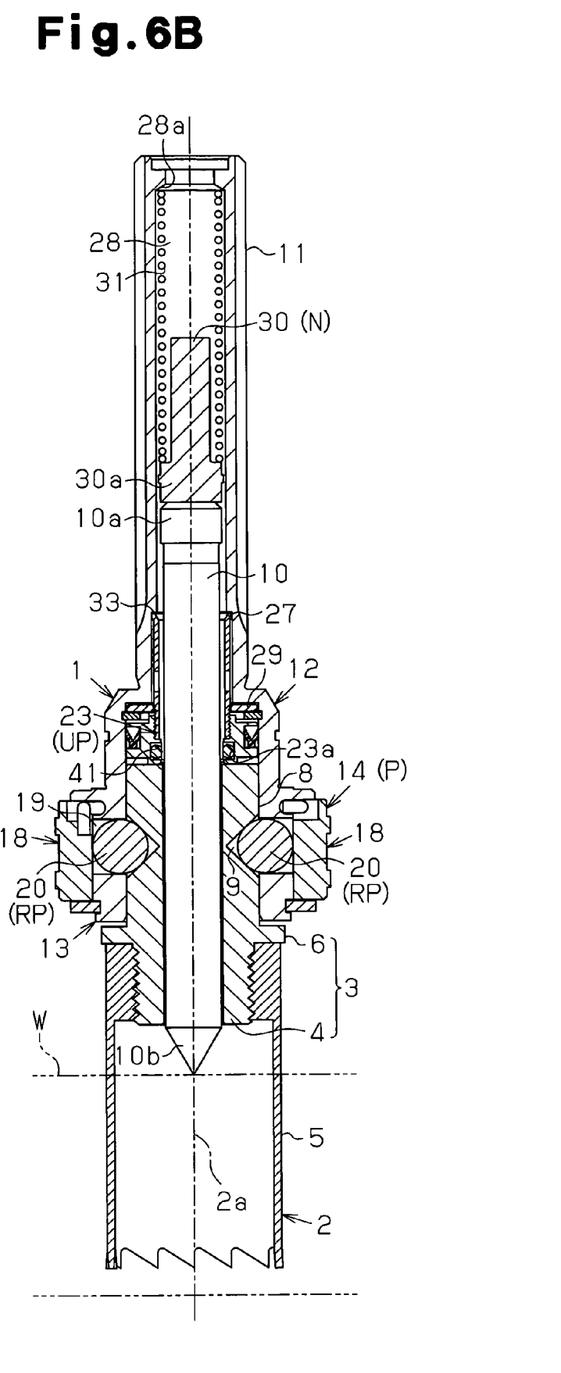
FIG. 6B is a longitudinal cross-sectional view of FIG. 6A.

First, in the state where the cutter 2 is locked in the cutter holder 1 as shown in FIGS. 4A and 4B, the distal end 10b of the central shaft 10 is brought into contact with the workpiece W as shown in FIGS. 6A and 6B. The pressing head 10a of the central shaft 10 abuts against the abutment portion 30a of the valve body 30. As shown in FIGS. 6A and 6B, as the blade cylinder 5 cuts in the workpiece W, the workpiece W causes the central shaft 10 and the valve body 30 to move relative to the support cylinder 12 against the urging force of the dual purpose spring 31.

That is, when the pressing head 10a of the central shaft 10 that receives the external force urges the valve body 30 toward the spring accommodating hole 28 from the open cylinder 13, the valve body 30 moves toward the ceiling 28a against the urging force of the dual purpose spring 31. Thus, the dual purpose spring 31 is compressed, and the valve body 30 separates (retracts) from the stopper body 23. That is, the valve body 30 is brought into the open valve state N. Thus, the cutting oil supplied from the machine tool (not shown) to the spring accommodating hole 28 flows through the valve hole 23a into the support cylinder 12. The cutting oil in the support cylinder 12 flows through a clearance between the outer circumferential surface of the central shaft 10 and the inner circumferential surface of the shank 3, and is supplied to the blade cylinder 5 and the workpiece W.

The preferred embodiment has the following advantages.

(1) The valve hole 23a, which is selectively opened and closed by the valve body 30, is formed in the stopper body 23. The stopper body 23 is switchable between the contact state DQ, where the stopper body 23 holds the locking balls 20 in the unlocked state SQ, and the non-contact state UP, where the stopper body 23 retracts from the locking balls 20. When the valve body 30 detachably engages with the stopper body 23, the valve body 30 and the stopper body 23 are interlocked. Thus, the urging force of the dual purpose spring 31 is also transmitted to the stopper body 23 via the valve body 30. That is, the stopper body 23 and the valve body 30 are engaged with each other with the interlocking portion 32 to be movable relative to each other. Since the dual purpose spring 31, which urges the valve body 30, also urges the stopper body 23, the structure of the cutter holder 1 is simplified by reducing the number of springs included in the cutter holder 1. The size of the entire cutter holder 1 is thus reduced.

(2) The stopper body 23 and the valve body 30 are engaged with each other by the interlocking portion 32 when urged by the dual purpose spring 31 so as to be interlocked with each other. Furthermore, the stopper body 23 and the valve body 30 are engaged with each other by the interlocking portion 32 also when being urged against the force of the dual purpose spring 31 so as to be interlocked with each other. Moreover, when only the valve body 30 is urged against the elastic force of the dual purpose spring 31, the valve body 30 is detachable from the stopper body 23. Thus, the cutter holder 1 provided with the dual purpose spring 31 is easily manufactured.

(3) The support cylinder 12 supports the stopper body 23 to be movable in the direction of the rotation axis 2a of the cutter 2. The dual purpose spring 31 supports the valve body 30 to be movable in the direction of the rotation axis 2a relative to the stopper body 23. Thus, the sizes of the stopper body 23 and the valve body 30, which have different functions from each other, are reduced.

(4) The stopper body 23 has the engaging rim 27 for engaging with the step 33. Thus, the stopper body 23 is reliably stopped in the contact state DQ.

(5) The stopper body 23 is cylindrical. The valve body 30 is selectively inserted inside the stopper body 23. The dual purpose spring 31 supports the valve body 30. Thus, the sizes of the stopper body 23, the valve body 30, and the dual purpose spring 31, which have different functions from one another, are reduced.

(6) The stopper body 23 includes the stopper ring 24, which holds the locking balls 20 in the unlocked state SQ, and the engaging cylinder 25, which extends from the stopper ring 24 in the direction of the rotation axis 2a. The engaging cylinder 25 is provided with the engaging rim 27. Thus, the sizes of the stopper ring 24 and the engaging cylinder 25, which have different functions from each other, are reduced.

(7) The stopper ring 24 is screwed to the engaging cylinder 25. Thus, the stopper body 23 configured by the stopper ring 24 and the engaging cylinder 25, which have different functions from each other, is easily manufactured.

(8) The cutter holder 1 has the lock spring 17, which urges the locking operation cylinder 14 from the unlocking position Q toward the locking position P. Thus, the size of the locking operation cylinder 14 is reduced.

The preferred embodiment may be modified as follows.

When the distal end 10b of the central shaft 10 projects from the blade cylinder 5 as shown in FIG. 1B, the pressing head 10a of the central shaft 10 may project from the insertion portion 6 of the cutter 2. In this case, when the insertion portion 6 is inserted in the support hole 15, the pressing head 10a abuts against the valve body 30 first, and the insertion portion 6 abuts against the stopper body 23 thereafter.

The invention claimed is:

1. A cutter holder to which a cutter is attached, the cutter defining a rotation axis, the cutter including an insertion portion, which is inserted in the cutter holder, and a central shaft, which is movable relative to the insertion portion in the direction of the rotation axis, the insertion portion including an outer surface, which extends along the rotation axis, the cutter holder comprising:

a support cylinder in which the insertion portion is detachably inserted;

a locking operation body, which is movable relative to the support cylinder, the locking operation body being movable between a locking position for locking the insertion portion in the support cylinder and an unlocking position where the insertion portion is permitted to be unlocked with respect to the support cylinder;

a lock body located between the outer surface and the support cylinder, the lock body being switchable between a locked state and an unlocked state, the locking operation body in the locking position brings the lock body into the locked state, the locking operation body in the unlocking position brings the lock body into the unlocked state, the lock body in the locked state is located radially inward of the outer surface, and the lock body in the unlocked state is permitted to retract radially outward of the outer surface;

a stopper body movable relative to the support cylinder, the stopper body being switchable between a contact state and a non-contact state, the stopper body in the contact state holds the lock body in the unlocked state, and the stopper body in the non-contact state is retracted from the lock body;

a pressing body, the pressing body being switchable between a standby state and a retracted state, the pressing body in the standby state selectively contacts the central shaft when the insertion portion is inserted in the support cylinder, the pressing body in the retracted state is retracted from the stopper body; and an urging member, which urges the pressing body such that the pressing body is brought into the standby state and urges the stopper body such that the stopper body is brought into the contact state, and the urging member detachably engages the pressing body to the stopper body.

2. The cutter holder according to claim 1, wherein the stopper body and the pressing body are movable in an interlocked manner, and wherein, when urged against urging force of the urging member, the pressing body is detachable from the stopper body.

3. The cutter holder according to claim 2, wherein the stopper body is movable relative to the support cylinder in the direction of the rotation axis, and wherein the pressing body is movable relative to the stopper body in the direction of the rotation axis.

4. The cutter holder according to claim 3, wherein the stopper body includes an engaging portion for engaging with the support cylinder when receiving urging force of the urging member.

5. The cutter holder according to claim 4, wherein the stopper body is cylindrical, wherein the pressing body includes an abutment portion, which is inserted inside the stopper body, the abutment portion facing the central shaft, and wherein the urging member supports the pressing body.

6. The cutter holder according to claim 5, wherein the stopper body includes:

a stopper cylinder for holding the lock body in the unlocked state; and an engaging cylinder, which extends from the stopper cylinder in the direction of the rotation axis, and wherein the engaging cylinder includes the engaging portion.

7. The cutter holder according to claim 6, wherein the stopper cylinder is screwed to the engaging cylinder.

* * * * *